United States Patent
Dedoes

[15] 3,650,331
[45] Mar. 21, 1972

[54] TRACTOR HAVING HITCH ASSEMBLY FOR MOUNTING A PLURALITY OF IMPLEMENTS

[72] Inventor: Arnold A. Dedoes, 2070 W. Eleven Mile Road, Berkley, Mich. 48072

[22] Filed: Mar. 23, 1970

[21] Appl. No.: 21,905

Related U.S. Application Data

[63] Continuation-in-part of Ser. No. 795,853, Feb. 3, 1969, and a continuation-in-part of Ser. No. 2,582, Jan. 13, 1970.

[52] U.S. Cl. .......................... 172/21, 172/464, 172/711
[51] Int. Cl. ............... A01b 45/02, A01b 59/06, A01b 65/06
[58] Field of Search ........................ 172/464–466, 452, 172/478, 619–621, 21–22, 142, 624, 506, 677–680, 439, 424, 445, 448, 449, 451, 572, 573, 661–662, 497, 498, 499, 462, 705, 707, 711, 708, 706, 643; 280/409 B, 479 A, 490 A; 94/50

[56] References Cited

UNITED STATES PATENTS

| | | |
|---|---|---|
| 2,414,072 | 1/1947 | Taft ........................................ 172/464 |
| 448,332 | 3/1891 | Funk et al. ............................. 172/643 |
| 2,070,425 | 2/1937 | Engel ..................................... 172/573 |
| 2,884,081 | 4/1959 | Weber .................................... 172/643 |
| 3,439,749 | 4/1969 | Olsson .................................... 172/572 |
| 3,411,589 | 11/1968 | Moe ....................................... 172/572 |

FOREIGN PATENTS OR APPLICATIONS

| | | | |
|---|---|---|---|
| 679,253 | 9/1952 | Great Britain ........................ 172/21 |
| 10,152 | 11/1933 | Australia .............................. 172/572 |
| 966,639 | 8/1957 | Germany .............................. 172/506 |
| 957,766 | 5/1964 | Great Britain ........................ 172/708 |

Primary Examiner—Robert E. Pulfrey
Assistant Examiner—C. W. Hanor
Attorney—Hauke, Gifford and Patalidis

[57] ABSTRACT

A draw bar and hitch connection for coupling a plurality of substantially identical implements to a tractor, and including means for permitting independent vertical movement of each implement relative to the ground as the tractor traverses the ground. The draw bar and hitch connection includes means for utilizing a power lift apparatus carried by the tractor to transfer a portion of the weight of the tractor to the implements and also includes means for disconnecting the plurality of implements from the tractor without disturbing the weight transfer means.

9 Claims, 10 Drawing Figures

Patented March 21, 1972  3,650,331

INVENTOR
ARNOLD A. DEDOES

BY Hauke, Gifford & Patalidis

ATTORNEYS

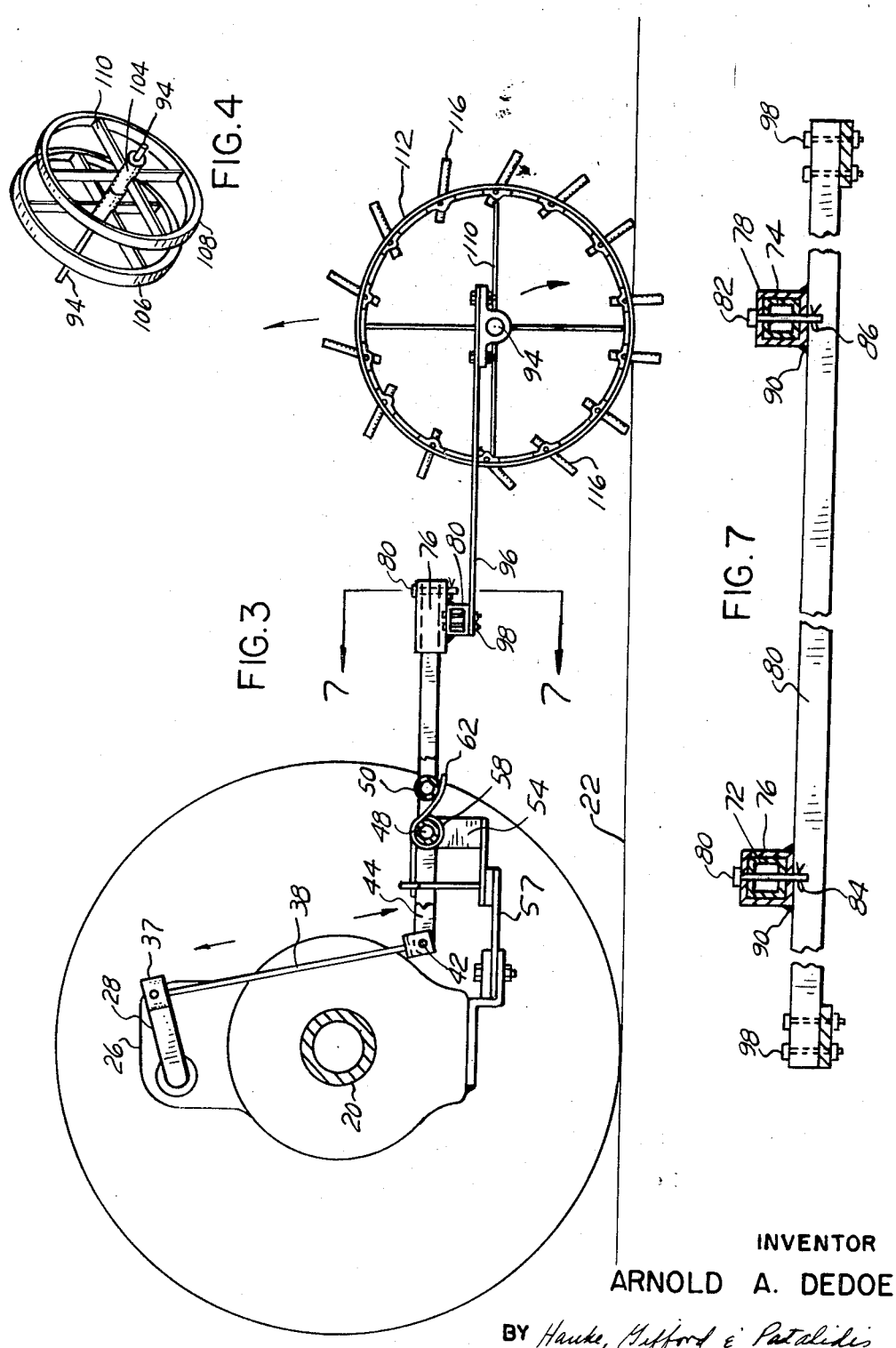

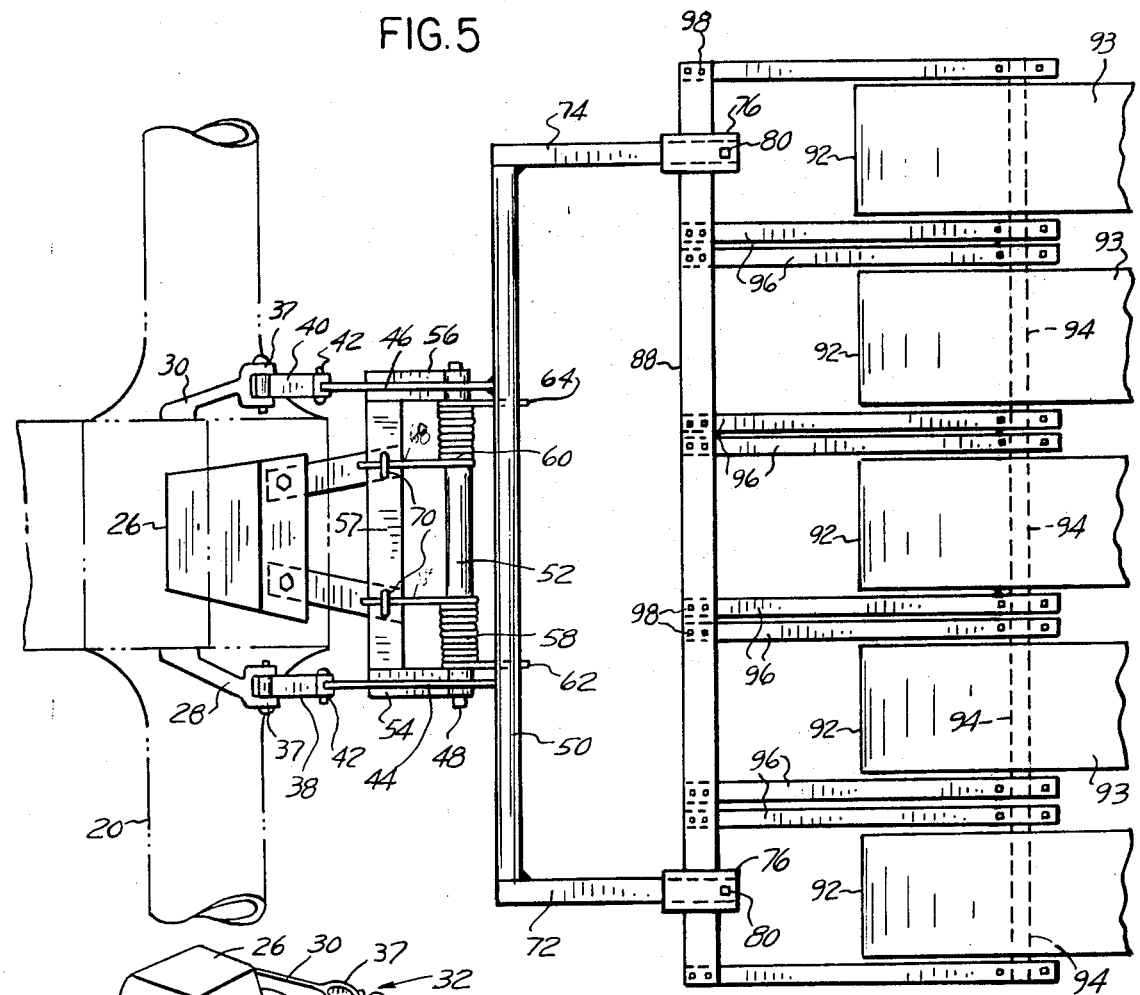
FIG.5
FIG.6
INVENTOR
ARNOLD A. DEDOES
ATTORNEYS

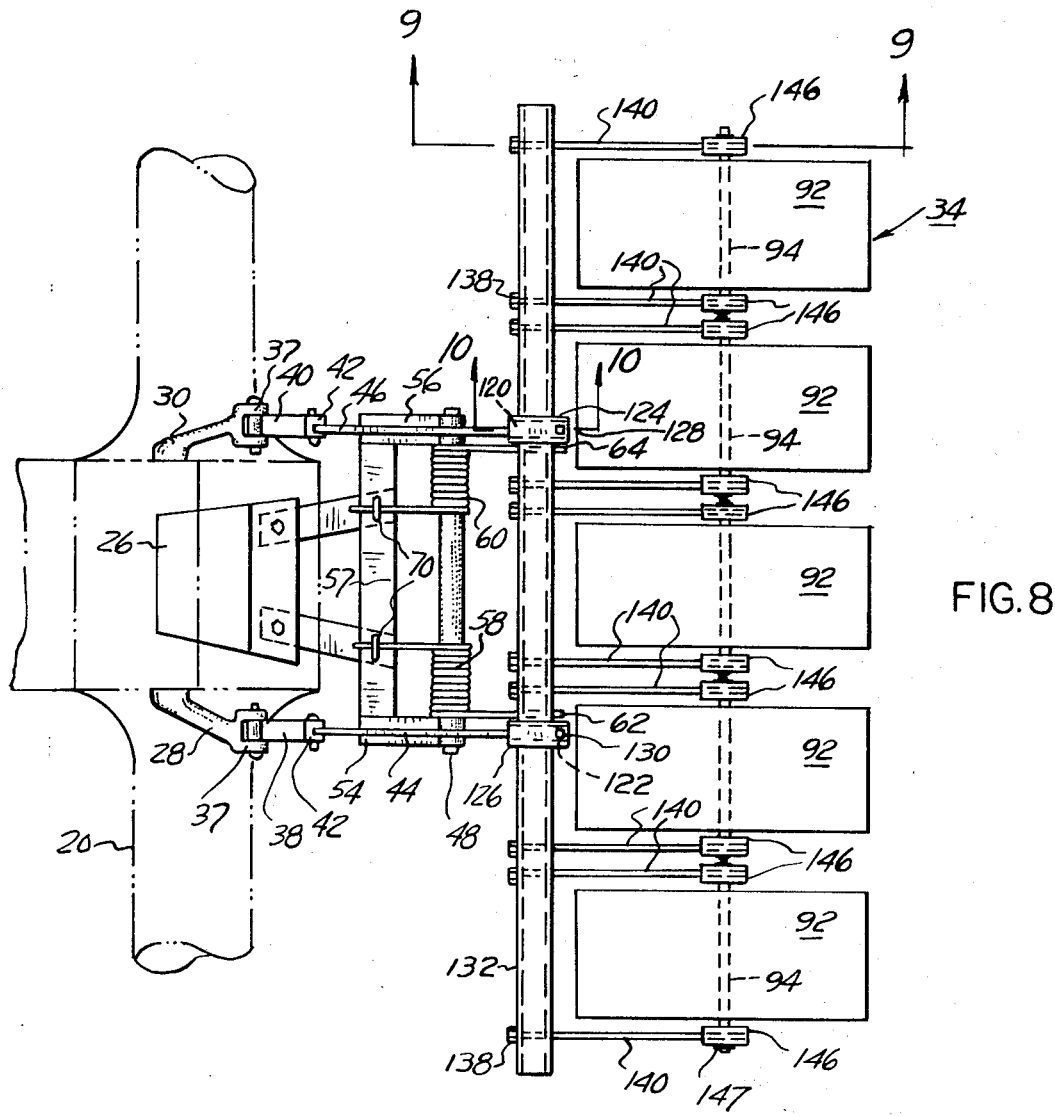
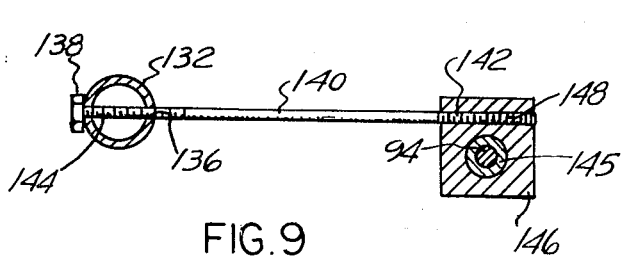
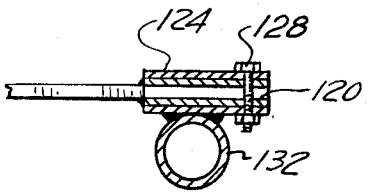
FIG. 8
FIG. 9
FIG. 10
INVENTOR
ARNOLD DEDOES
ATTORNEYS 3,650,331

TRACTOR HAVING HITCH ASSEMBLY FOR MOUNTING A PLURALITY OF IMPLEMENTS

REFERENCE TO RELATED APPLICATIONS

The present application is a continuation-in-part application of copending U.S. application, Ser. No. 795,853, filed Feb. 3, 1969, and U.S. application, Ser. No. 2,582, filed Jan. 13, 1970.

BACKGROUND OF THE INVENTION

1. Field Of The Invention

The present invention relates to tractor implements, and more particularly to a means for mounting a plurality of substantially identical implements such that each implement is adapted for independent vertical movement relative to the other implements.

2. Description Of The Prior Art

The aforementioned patent applications disclose a hitch assembly for tractors which has means for converting the upward motion of a power lift mechanism to a downward force exerted upon the implements attached to the tractor. In the second mentioned application a hitch and draw bar assembly is also provided which includes means for disconnecting the implement without any interference with the weight transfer mechanism. The draw bar and hitch assembly disclosed in the second application includes a pivotal draw bar comprising a pair of parallel arms pivotally supported intermediate their ends on a common pivot shaft supported on the tractor hitch bracket. The outer ends of the arms are provided with means to releasably and easily connect the implement, such as an aerator or the like, thereto. The opposite ends of the arms are connected by means of an extension rod to a weight transfer mechanism which is power actuated by means operably connected to the tractor driving mechanism. Normally the arms and thus the implement attached thereto are urged into a raised position above the ground by self-acting energy storing means, such as torsional springs, the force of which is overcome by the power actuated weight transfer mechanism to lower the implement to the ground by applying a predetermined load thereto.

The releasable implement connection provides a quick-changing coupling mechanism to permit a quick and easy implement conversion without use of special tools or equipment. The quick-change coupling mechanism is attached to a common axle in which a plurality of sub-components of the implement are carried for rotational movement.

While the construction disclosed in the aforementioned patent application has proven to be generally satisfactory, the present application is directed toward an improvement over that construction. The implements of the prior art generally function in an acceptable manner when passing over level ground; however, when the implement is used on hilly terrain, the valleys in the ground intermediate high points which the opposite ends of the implement pass over will be uneffected by the intermediate portion of the implement. It would therefore be desirable to provide a tractor drawn implement in which the various subcomponents thereof are adapted for independent vertical movement relative to one another to permit each portion of the implement to remain in contact with the ground even though the surface of the ground is uneven.

SUMMARY OF THE PRESENT INVENTION

The present invention, which will be described subsequently in greater detail, includes a draw bar having a pair of parallel arms pivotally supported intermediate their ends on a common pivot shaft supported on a tractor hitch bracket. In one embodiment of the invention the outer ends of the arm are provided with means to releasably and easily connect a second cross bar which carries the implements. The opposite ends of the arms are connected by means of extension rods to a weight transfer mechanism which is power actuated by means operably connected to the tractor driven mechanism. The second draw bar has a plurality of resilient support bars extending outwardly therefrom; each adjacent pair of support bars being adapted to carry one of a plurality of substantially identical implements.

The parallel arms of the first draw bar and thus the second draw bar and implements attached thereto are normally urged into a raised position above the ground level by self-acting energy storing means, such as torsion springs, the force of which is overcome by the power actuated weight transfer mechanism which lowers the implements to the ground and applies a predetermined load thereto. The individual mounting of each of the substantially identical implements permits each implement to traverse the terrain and maintain contact therewith irrespective of the vertical position of adjacent implement. This particular novel feature of independent suspension of each of the plurality of implements is accomplished by mounting each implement to the second draw bar by means of the resilient support bars.

In a second embodiment the first mentioned draw bar and parallel arms are eliminated and a simplified arrangement is employed to mount the implements for independent vertical movement relative to the ground.

The several objects, advantages and applications of the present invention will become apparent to those skilled in the art when the accompanying description of one example of the best mode contemplated for practicing the invention is read in conjunction with the accompanying drawings.

BRIEF DESCRIPTION OF THE DRAWINGS

The following detailed description refers to the accompanying drawings wherein like reference numerals refer to like parts and in which:

FIG. 3 is a transverse cross sectional view taken through the implement and rear axle of the tractor as seen substantially along line 3—3 of FIG. 2;

FIG. 4 is a detached perspective illustration of one wheel section of the exemplary implement illustrated in FIGS. 1–3 with the aerator strip having been removed;

FIG. 5 is a top plan view of the improved means for attaching a plurality of implements and the hitch and draw bar connection and associated weight transfer mechanism shown in the side view of FIG. 3;

FIG. 6 is a separate fragmentary perspective view of the rear axle of the tractor and the associated weight transfer mechanism and mounting means for a plurality of implements carried thereby;

FIG. 7 is a fragmentary cross section view through the coupling mechanism for attaching a plurality of implements to the tractor as seen along line 7—7 of FIG. 3;

FIG. 8 is a top plan view similar to FIG. 5 illustrating a second embodiment of the present invention;

FIG. 9 is an enlarged transverse sectional view taken generally along line 9—9 of FIG. 8; and FIG. 10 is an enlarged transverse sectional view taken along line 10—10 of FIG. 9.

DESCRIPTION OF THE PREFERRED EMBODIMENT

Figure 1:
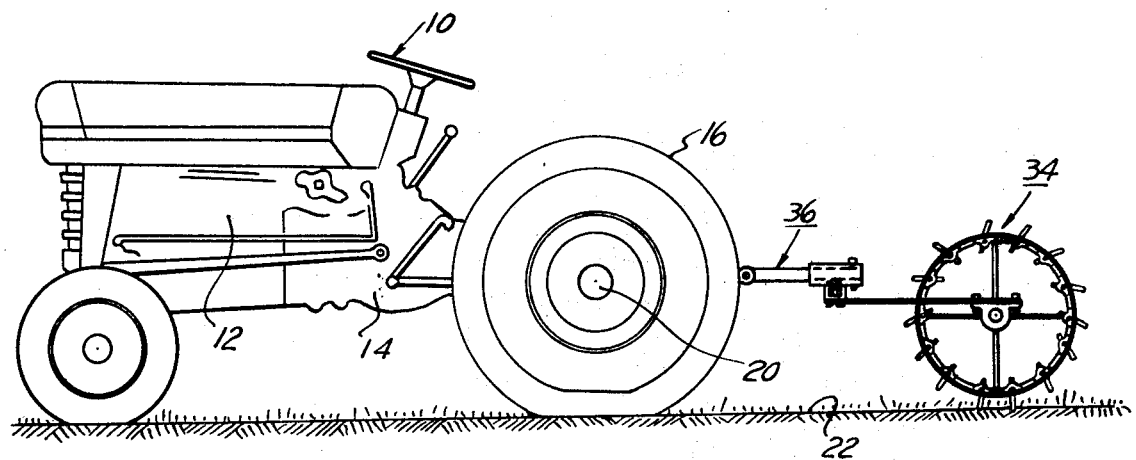
FIG. 1 is a side elevation of a tractor and an exemplary implement drawn thereby and incorporating the present invention.
Figure 2:
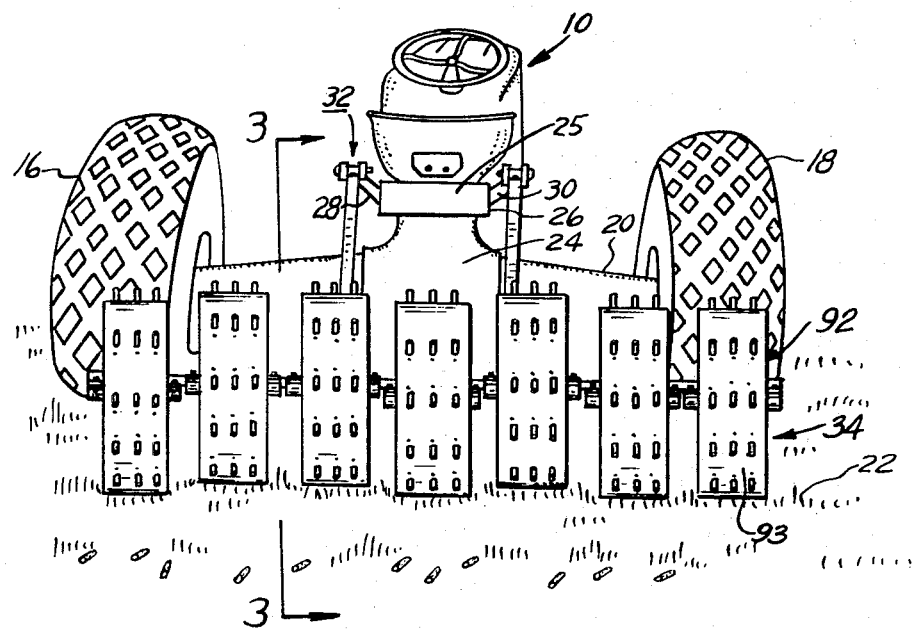
FIG. 2 is a rear view of the tractor and attached implement illustrated in FIG. 1.

Referring now to the drawings, and particularly FIGS. 1 and 2, there is illustrated a towing vehicle such as a tractor 10 equipped with an engine 12 and a transmission 14 adapted to drive a pair of rear driving wheels 16, 18, which in turn are supported on a rear axle 20, for driving engagement with the ground surface 22. A conventional differential drive mechanism is enclosed in an enlarged portion 24 on the rear axle 20 intermediate the wheels 16, 18. A power takeoff unit 25 enclosed within a housing 26 mounted on top of the enlarged axle portion 24 has a pair of arms 28, 30 suitably connected to the opposite sides of the output of the power takeoff and are adapted for pivotal movement with respect to the power takeoff to drove a lift mechanism, generally indicated at 32. An implement generally indicated at 34 is drawn by the tractor 10 by means of a hitch and draw bar assembly, generally indicated at 36, and connected to the power lift arms 28, 30.

The lift mechanism 32 is of the conventional type provided with tractors and is operable to provide power in an upward direction such that it is normally adapted for use in lifting implements or the like in a vertical direction away from the ground 22. The hitch and draw bar 36 acts to convert the normal upward movement of the arms 28, 30 into a downwardly directed force on the implement 34.

Referring to FIGS. 3, 5 and 6 for a more detailed description of the assembly 36 and the implement 34, it can be seen that the pivotally mounted arms 28, 30, each have a yoke 37 formed at one end, on which are pivotally mounted a pair of actuating rods 38, 40. The actuating rods 38, 40 extend in a parallel relationship downwardly from the arms 28, 30 and are adapted for pivotal connection at their opposite ends by means of a second yoke arrangement 42, respectively to a pair of parallel, substantially horizontally disposed extension rods 44 and 46, whose opposite ends are integrally joined to a transverse tubular member 50. The extension rods 44 and 46 are mounted for pivotal movement intermediate their ends on a common pivot shaft 48 extending parallel to the transverse tubular member 50. The pivot shaft 48 fixedly carries a supporting tube 52. The pivot shaft 48 is supported on a pair of brackets 54 and 56. The brackets 54 and 56 are in turn carried by a bracket support member 57 that is rigidly attached to the axle 20. When the implement 34 is not in use and the power lift mechanism 32 is not transferring a downwardly directed force thereto, a pair of torsional springs 58 and 60 wound around the support tube 52 and having extending ends 62 and 64 respectively engaging the underside of the transverse tubular member 50, exert an upwardly directed force against the tubular member 50 so as to lift the same and the implement 34 vertically off the ground 22, as will be described in greater detail hereinafter. The other ends 66 and 68 of the springs 58 and 60 respectively are each non-movably secured rearwardly of the support tube 52 to eyebolt type fasteners 70, which in turn are carried by the bracket support member 57.

A pair of parallel arms 72 and 74 are attached to the opposite ends of the transverse tubular member 50 and extend therefrom in a horizontal direction rearwardly of the tractor and substantially in the same plane as the extension rods 44 and 46. The opposite ends of each of the arms 72 and 74 are adapted to be telescopically received in complementary shaped tubular members 76 and 78. The tubular shaped arms 72 and 74 are respectively secured to the complementary shaped tubular members 76 and 78 by pins 80 and 82 respectively as shown in FIG. 7. Cotter pins 84 and 86 insure against accidental removal of the pins 80 and 82. Each of the complementary shaped tubular members 76 and 78 is attached to the upper side of a transverse implement draw bar 88 by any suitable fastener such as by welding as indicated at 90.

The implement 34 is shown for purposes of convenience as comprising a plurality of substantially similar aerator units 92, however it is contemplated that other units such as graders, rollers, and soil slicers may be used with the present invention. The aerator units 92 are arranged in a side by side relationship and each is carried on its own axle shaft 94. Each of the aerator units 92 is comprised of a wheel assembly 93 adapted for independent rotary motion about its axle shaft 94 and is further adapted for independent vertical movement with respect to the ground 22 and adjacent wheel assemblies 93 as the aerator units 92 traverse the ground 22 as will be explained hereinafter. The wheel assemblies are connected to the transverse implement draw bar 88 by a plurality of flexible steel support bands 96 the ends of which are fixedly secured to the underside of the implement draw bar 88 by any suitable means, such as bolts 98. Each adjacent pair of steel support bands 96 extends outwardly from the implement draw bar 88 in a cantilever fashion to the opposite sides of each wheel assembly 93 and is connected to each axle shaft 94 by any suitable means which securely retains the outer ends of the steel support bands 96 onto the axle shaft 94 while permitting free rotation of the wheel assemblies 93.

Referring now to FIGS. 8, 9 and 10 for a detailed description of another embodiment of the present invention, the horizontally disposed extension rods 44 and 46 of the lift mechanism 32 respectively have tubular members 120 and 122 welded to their ends. The tubular members 120 and 122 are respectively secured to complementary shaped tubular members 124 and 126 by pins or other similar fasteners 128 and 130, in the same manner as hereinbefore described in the connection of the complementary shaped tubular members 76 and 78 to the parallel arms 72 and 74.

Each of the complementary shaped tubular members 124 and 126 is attached to the upper side of a transverse tubular implement draw bar 132 by any suitable fastener, such as by welding. The extending ends 62 and 64 of the torsional springs 58 and 60 engage the underside of the transverse tubular implement draw bar 132 and exert an upwardly directed force against the same so as to lift the implement 34 vertically off the ground in a manner which will be explained in greater detail hereinafter. The tubular draw bar 132 has a plurality of axially spaced, horizontally extending radial bores 136, each having a threaded member 138 axially aligned therewith and welded to the front end of the tubular draw bar 132.

The units 92 are connected to the tubular implement bar 132 by a plurality of flexible steel round bars 140, the opposite ends 142 and 144 being threaded. Each axle shaft 94 of the wheel assemblies 93 is carried at opposite ends for rotational movement within bearings 145 disposed in bearing blocks 146, which are securely retained to the outer ends of the axle shafts 94 by any suitable means such as the snap ring 147. Each of the bearing blocks 146 has a horizontally disposed threaded bore 148 proximate the top portion thereof which is engaged by the threaded ends 142 of each round bar 140. The opposite ends 144 of each round bar 140 extends through the radial bores 136 and engages the threaded member 138 so as to fixedly retain each wheel assembly 93 to the tubular draw bar 132. Thus, each adjacent pair of round steel bars 140 extends outwardly from the tubular implement draw bar 132 in a cantilever fashion to the opposite side of each unit assembly 92, and is connected to the individual axle shafts 94 by means of the threaded bores 148 in each of the bearing blocks 146.

Referring to FIG. 4, each of the substantially identical units 92 comprises a central hub portion 104 on which the individual axle shaft 94 is carried. The hub is equipped with a pair of spaced spoke wheels 106, 108, each having a rim portion connected to the hub portion 104 by means of radially extending spokes 110. As can best be seen in FIG. 3 the individual wheel assemblies 93 of the aerator units 92 are adapted to be equipped with a soil penetrating steel band 112 similar to that disclosed in applicant's U.S. Pat. Nos. 3,221,822 and 3,316,979 and copending application, Ser. No. 795,853. The steel bands 112 are of a length slightly longer than the circumference of the rim portion of the pair of wheels 106, 108, and of a width larger than the space between the wheels 106, 108. The steel bands 112 are provided with a plurality of equally radially and transversely spaced soil penetration elements 116 extending generally in a normal direction from the surface of the steel bands 112 in the fashion of spikes and are adapted to enter into the soil of the ground 22.

The steel support bands 96 and the steel round bars 140 must be flexible enough to permit independent vertical movement of each of the units 92 as the implement 34 traverses the ground 22 but strong enough to transmit forces from the arms 28 and 30 to the wheel assemblies 93 as will become clearer as the description proceeds. As seen in FIG. 2, when the implement 34 is traversing hilly terrain, the steel support bands 96 or the steel round bars 140 must permit each of the units 92 to move vertically with respect to the ground so that each wheel assembly 93 engages the ground 22 irrespective of the vertical position of adjacent wheel assemblies 93. As can best be seen in FIG. 5 and FIG. 8 flexible steel support bands 96 or the steel round bars 140 connecting the transverse implement draw bar 88 or the tubular implement draw bar 132 to each of the units 92 must also be of sufficient strength and rigidity as to raise the implements 34 off the ground when the implement draw bar 88 or the tubular implement draw bar 132 is raised by the torsional springs 58 and 60 when the power takeoff lift mechanism 25 is not operative.

When no force is exerted on the actuating rods 38, 40 or when the engine of the tractor is nonoperative, the spring ends 62 and 64 of the torsional springs 58 and 60 act against the transverse tubular member 50 or the tubular implement draw bar 132 to urge the same and thus the aerator units 92 upwardly away from the ground surface 22. In so doing, the force exerted by the torsional springs 58 and 60 against the transverse tubular member 50 or the tubular implement draw bar 132 tends to pivot the assembly 32 around the common pivot shaft 48 to which the extension rods 44 and 46 are secured, thereby drawing the actuating rods 38, 40 downwardly.

During operation of the tractor 10, when it is desirable to utilize the implement 34 for working the ground surface 22, the power takeoff 25 is actuated by the operator of the tractor to actuate pivoting of the linking arms 28 and 30 upwardly to thereby pull the actuating rods 38 and 40 likewise upwardly, to exert an upwardly directed pulling force on the ends of the extension rods 44 and 46 to pivot them around the common pivot shaft 48 against the force of the torsion springs 58 and 60 to thereby move the implement draw bar 88 or the tubular implement draw bar 132 downwardly and thus the units 92 of the implement 34 against the ground surface 22. Depending upon the type of units 92 utilized and the required load of these units upon the ground surface, a continuous downward force can be produced of predetermined magnitudes on the actuating rods 38 and 40 by the power takeoff 25 so as to maintain the implement 34 at any desired load contact with the ground surface 22, thus the weight of the tractor is shifted to a downwardly directed force holding the implement 34 in contact the the ground 22.

If the implement 34 is being drawn over obstructions on the ground surface 22 or if the ground surface 22 is contoured in a hilly manner as illustrated in FIG. 2, the flexibility of each of the steel support bands 96 or steel round bars 140 will permit that particular wheel to pass over the raised ground while permitting the adjacent wheels to continue to engage the relatively lower ground surface. As indicated hereinbefore, the prior art devices would maintain all the wheels on the level of the highest portion of the surface thereby preventing contact with the lower portions of the ground.

It should be noted that the individual mounting of the units 92 may take several forms other than the cantilever type support bands 96 and the steel round bars 140. For example, each of the flexible steel support bands 96 may be replaced with a more rigid steel member which is attached to the implement draw bar 88 by a coiled spring which provides the resiliency necessary for the implement to function in the manner hereinbefore described. Still other mounting means may be used such as mounting each support band for pivotal movement relative to the implement draw bar 88 and using torsional springs similar to the torsional springs 58 and 60 for biasing the pivotal bands and thus the individual units upwardly.

Therefore, it can be seen that the present invention has provided a means for mounting a plurality of substantially identical ground treating units to be drawn by a tractor or the like in which each of the individual units is adapted for horizontal movement with respect to the ground, while at the same time each unit is adapted for vertical movement so the units may follow the contour of the ground independent of adjacent units.

Having thus described the invention, what is claimed is as follows:

1. In combination with a tractor having a drive axle, a pair of ground engaging wheels carried by the drive axle and a driving mechanism connected with the drive axle for driving said wheels, said tractor having a power lift apparatus, a hitch and weight transfer assembly for attaching an implement to said tractor, said assembly comprising:

first means attached to said power lift apparatus for converting the upward force produced by said apparatus to a downward force and for transmitting said downward force to said implement, second means connectable between said implement and said first means for attaching and detaching said implement without disturbing said first means, said first means comprising a rotatable link connected to said power lift apparatus, an actuating rod pivotally connected at one end to the free end of said link and at the other end to one end of an arm, said arm being pivotally connected intermediate its ends to a support secured to said drive axle, the other end of said arm being connected to said implement by said second means and a spring member urging the end of said arm connected with said implement in a direction away from the ground and toward an inoperative position, said implement comprising a plurality of substantially similar ground treating units, and third means connectable between said second means and said plurality of units for individually mounting said plurality of units for independent vertical movement relative to one another and to the ground as said plurality of units traverses the ground.

2. The combination as defined in claim 1 and in which said third means comprises a support bar connectable to said tractor by said second means and at least one resilient member carried at one end by said support bar and said resilient member carrying one of said units at its other end.

3. The combination as defined in claim 1 and in which said third means comprises a horizontal support bar, a plurality of flexible members each having one of their ends fixed to said support bar, the opposite ends of each of said flexible members being connected to and rotatably supporting one of said units such that each of said plurality of units is mounted for vertical movement relative to the other of said plurality of units as said units traverse the ground.

4. The improvement as defined in claim 3, wherein said flexible members are made from a spring steel.

5. The improvement as defined in claim 3, wherein said support bar is a tubular shaft having a plurality of spaced transversely extending bores, internally threaded, means registering with said bore, said plurality of flexible members being metallic round bars having one end threaded and engaging said threaded means.

6. The improvement as defined in claim 5, including bearing means for individually carrying each of said plurality of units for rotational movement about a generally horizontal axis, the other end of said metallic round bars being threaded and engaging said bearing means.

7. The improvement as defined in claim 6, wherein said metallic round bars are made from a spring steel.

8. The improvement as defined in claim 1, wherein said arm is provided with a transverse member and said spring member comprises a coil spring wound around said pivot support for said arm in a direction parallel to said transverse member, said coil spring having free ends extending away therefrom in opposite directions normal to the central axis of said spring, one of said free ends being restrained from movement, the other of said free ends being adapted to abut said transverse member to exert a rotational force thereagainst urging said arm upwardly.

9. The improvement as defined in claim 3, wherein said second means comprises a tubular member carried by said implement support bar, for telescopically receiving one end of said arm.

* * * * *